United States Patent
Hodge

(10) Patent No.: US 11,595,701 B2
(45) Date of Patent: *Feb. 28, 2023

(54) SYSTEMS AND METHODS FOR A VIDEO SHARING SERVICE WITHIN CONTROLLED ENVIRONMENTS

(71) Applicant: **GLOBAL TEL*LINK CORPORATION**, Reston, VA (US)

(72) Inventor: Stephen Lee Hodge, Aubrey, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/556,653

(22) Filed: Aug. 30, 2019

(65) Prior Publication Data

US 2019/0387255 A1   Dec. 19, 2019

Related U.S. Application Data

(63) Continuation of application No. 15/661,840, filed on Jul. 27, 2017, now Pat. No. 10,405,007.

(51) Int. Cl.
*H04N 21/214* (2011.01)
*H04N 21/234* (2011.01)
(Continued)

(52) U.S. Cl.
CPC ....... *H04N 21/214* (2013.01); *H04N 21/2143* (2013.01); *H04N 21/2353* (2013.01);
(Continued)

(58) Field of Classification Search
CPC ............. H04N 21/214; H04N 21/2143; H04N 21/23418; H04N 21/2353; H04N 21/251;
(Continued)

(56) References Cited

U.S. PATENT DOCUMENTS 5,757,417 A   5/1998   Aras et al.
5,796,948 A   8/1998   Cohen
(Continued)

FOREIGN PATENT DOCUMENTS

WO   WO 2013/096944 A1   6/2013

OTHER PUBLICATIONS

Copyright Registration Record for "iPhone: The Missing Manual," 6th ed., 2012; 1 page.
(Continued)

*Primary Examiner* — Nasser M Goodarzi
*Assistant Examiner* — Jaycee Imperial
(74) *Attorney, Agent, or Firm* — Sterne, Kessler, Goldstein & Fox P.L.L.C.

(57) ABSTRACT

A system for a video sharing service for inmates in correctional facilities is disclosed. The system includes an inmate device of an inmate, a database storing inmate profiles, and a video sharing server configured to receive a registration request from the inmate device for registration of an inmate for the video sharing service, the registration request including user credentials of the inmate, retrieve an inmate profile of the inmate from the database, authenticate the inmate based on the user credentials and the inmate profile, create an account for the inmate for the video sharing service in response to authentication of the inmate, receive an upload request to upload a video from the inmate device, analyze the video for restricted content, and assign a rating to the video based on the analysis.

17 Claims, 7 Drawing Sheets

(51) Int. Cl.

| | | |
|---|---|---|
| *H04N 21/235* | (2011.01) | |
| *H04N 21/258* | (2011.01) | |
| *H04N 21/25* | (2011.01) | |
| *H04N 21/2743* | (2011.01) | |
| *H04N 21/437* | (2011.01) | |
| *H04N 21/472* | (2011.01) | |
| *H04N 21/475* | (2011.01) | |
| *H04N 21/482* | (2011.01) | |
| *H04N 21/8405* | (2011.01) | |
| *H04N 21/436* | (2011.01) | |

(52) U.S. Cl.
CPC ..... *H04N 21/23418* (2013.01); *H04N 21/251* (2013.01); *H04N 21/25875* (2013.01); *H04N 21/2743* (2013.01); *H04N 21/437* (2013.01); *H04N 21/4753* (2013.01); *H04N 21/47202* (2013.01); *H04N 21/4828* (2013.01); *H04N 21/8405* (2013.01); *H04N 21/43622* (2013.01)

(58) Field of Classification Search
CPC ........... H04N 21/25875; H04N 21/239; H04N 21/437; H04N 21/6118; H04N 21/6168; H04N 21/17309; H04N 21/2743; H04N 21/43622; H04N 21/27202; H04N 21/4753; H04N 21/4828; H04N 21/8405; H04L 65/612; H04L 65/80
USPC .......................................................... 725/28
See application file for complete search history.

(56) References Cited

U.S. PATENT DOCUMENTS

| | | | |
|---|---|---|---|
| 6,330,537 B1 | 12/2001 | Davis et al. | |
| 6,684,240 B1 | 1/2004 | Goddard | |
| 6,734,900 B2 | 5/2004 | Mayhew | |
| 6,740,802 B1 | 5/2004 | Browne, Jr. | |
| 6,810,527 B1 | 10/2004 | Conrad et al. | |
| 6,829,582 B1 | 12/2004 | Barsness | |
| 7,027,659 B1 | 4/2006 | Thomas | |
| 7,752,274 B2 | 7/2010 | Pagan | |
| 7,818,392 B1 | 10/2010 | Martino et al. | |
| 7,911,513 B2 | 3/2011 | Garrison et al. | |
| 7,973,230 B2 | 7/2011 | Mahowald | |
| 8,005,913 B1 | 8/2011 | Carlander | |
| 8,131,763 B2* | 3/2012 | Tuscano ............... G06F 16/9535 | |
| | | | 707/783 |
| 8,358,837 B2 | 1/2013 | Shakya et al. | |
| 8,380,725 B2 | 2/2013 | Borst et al. | |
| 8,537,981 B1 | 9/2013 | Cyriac et al. | |
| 8,700,409 B1 | 4/2014 | Persson et al. | |
| 8,789,040 B1* | 7/2014 | Callary ..................... G06F 8/61 | |
| | | | 717/178 |
| 8,832,374 B1 | 9/2014 | Schaefers | |
| 8,917,848 B2 | 12/2014 | Torgersrud et al. | |
| 8,929,525 B1 | 1/2015 | Edwards | |
| 9,083,850 B1 | 7/2015 | Higgs | |
| 9,106,789 B1 | 8/2015 | Shipman, Jr. et al. | |
| 9,282,087 B1 | 3/2016 | Fredinburg et al. | |
| 9,332,014 B2 | 5/2016 | Keiser et al. | |
| 9,674,198 B1 | 6/2017 | Hodge | |
| 10,015,546 B1 | 7/2018 | Petty | |
| 10,122,825 B1 | 11/2018 | Petty | |
| 10,405,007 B2 | 9/2019 | Hodge | |
| 10,516,918 B2 | 12/2019 | Petty | |
| 11,113,757 B1* | 9/2021 | Latorre ............... G06F 16/9535 | |
| 2001/0001159 A1 | 5/2001 | Ford | |
| 2002/0147782 A1 | 10/2002 | Dimitrova et al. | |
| 2003/0126267 A1 | 7/2003 | Gutta et al. | |
| 2003/0192044 A1 | 10/2003 | Huntsman | |
| 2004/0006767 A1 | 1/2004 | Robson et al. | |
| 2004/0172652 A1 | 9/2004 | Fisk et al. | |
| 2005/0022229 A1 | 1/2005 | Gabriel et al. | |
| 2005/0268317 A1 | 12/2005 | Cormack et al. | |
| 2006/0031870 A1 | 2/2006 | Jarman et al. | |
| 2006/0075015 A1 | 4/2006 | Wu et al. | |
| 2006/0095262 A1 | 5/2006 | Danieli | |
| 2006/0280177 A1 | 12/2006 | Gupta et al. | |
| 2007/0015573 A1 | 1/2007 | Angell | |
| 2007/0157281 A1* | 7/2007 | Ellis .................. H04N 7/17309 | |
| | | | 725/134 |
| 2007/0179355 A1* | 8/2007 | Rosen .................... G16H 40/63 | |
| | | | 600/300 |
| 2007/0202941 A1* | 8/2007 | Miltenberger ...... G07F 17/3255 | |
| | | | 463/25 |
| 2008/0059991 A1 | 3/2008 | Romano | |
| 2008/0134282 A1 | 6/2008 | Fridman et al. | |
| 2008/0184284 A1 | 7/2008 | O'Hern | |
| 2008/0201158 A1 | 8/2008 | Johnson et al. | |
| 2008/0250484 A1 | 10/2008 | Chong et al. | |
| 2009/0013052 A1 | 1/2009 | Robarts et al. | |
| 2009/0013359 A1 | 1/2009 | Butler et al. | |
| 2009/0089828 A1 | 4/2009 | Carlsgaard et al. | |
| 2009/0228557 A1 | 9/2009 | Ganz et al. | |
| 2009/0234784 A1 | 9/2009 | Buriano et al. | |
| 2009/0240586 A1 | 9/2009 | Ramer et al. | |
| 2009/0254499 A1 | 10/2009 | Deyo | |
| 2009/0313546 A1* | 12/2009 | Katpelly ........... H04N 21/23439 | |
| | | | 715/723 |
| 2009/0328093 A1 | 12/2009 | Cansler et al. | |
| 2010/0094878 A1 | 4/2010 | Soroca et al. | |
| 2010/0138455 A1 | 6/2010 | Alewine | |
| 2010/0312542 A1* | 12/2010 | Van Wyk ............... G06Q 10/00 | |
| | | | 703/22 |
| 2011/0004831 A1 | 1/2011 | Steinberg et al. | |
| 2011/0065419 A1 | 3/2011 | Book et al. | |
| 2011/0093473 A1 | 4/2011 | Basso et al. | |
| 2011/0153328 A1 | 6/2011 | Lim et al. | |
| 2011/0237221 A1 | 9/2011 | Prakash et al. | |
| 2011/0249073 A1 | 10/2011 | Cranfill et al. | |
| 2011/0251901 A1 | 10/2011 | Kwon et al. | |
| 2011/0307548 A1 | 12/2011 | Fisk et al. | |
| 2012/0201362 A1 | 8/2012 | Crossan et al. | |
| 2012/0239763 A1 | 9/2012 | Musil | |
| 2012/0257583 A1 | 10/2012 | Keiser et al. | |
| 2012/0262271 A1 | 10/2012 | Torgersrud et al. | |
| 2012/0324244 A1 | 12/2012 | Zipperer et al. | |
| 2012/0324504 A1* | 12/2012 | Archer ............... H04N 21/4751 | |
| | | | 725/30 |
| 2013/0040629 A1* | 2/2013 | Sprigg ............. H04N 21/25841 | |
| | | | 455/419 |
| 2013/0090917 A1 | 4/2013 | Chalmers et al. | |
| 2013/0179949 A1 | 7/2013 | Shapiro | |
| 2013/0252575 A1 | 9/2013 | Ewell et al. | |
| 2014/0033230 A1 | 1/2014 | Hanna et al. | |
| 2014/0215391 A1 | 7/2014 | Little et al. | |
| 2014/0218466 A1 | 8/2014 | Bloms et al. | |
| 2014/0253663 A1 | 9/2014 | Edwards | |
| 2014/0267547 A1 | 9/2014 | Torgersrud et al. | |
| 2014/0270126 A1 | 9/2014 | Torgersrud et al. | |
| 2014/0273929 A1 | 9/2014 | Torgersrud | |
| 2014/0279789 A1 | 9/2014 | Torgersrud | |
| 2014/0280524 A1 | 9/2014 | Paradise et al. | |
| 2014/0280559 A1 | 9/2014 | Torgersrud | |
| 2014/0280632 A1 | 9/2014 | Torgersrud et al. | |
| 2014/0282898 A1 | 9/2014 | Torgersrud | |
| 2014/0325561 A1 | 10/2014 | Allen et al. | |
| 2014/0344956 A1 | 11/2014 | Garben | |
| 2015/0050910 A1 | 2/2015 | Torgersrud | |
| 2015/0070516 A1 | 3/2015 | Shoemake et al. | |
| 2015/0188925 A1 | 7/2015 | Gupta | |
| 2015/0215254 A1 | 7/2015 | Bennett | |
| 2015/0301703 A1 | 10/2015 | Steinberg et al. | |
| 2016/0191484 A1* | 6/2016 | Gongaware ........... G06Q 50/26 | |
| | | | 726/7 |
| 2016/0246791 A1* | 8/2016 | Long ................ G06F 16/24578 | |
| 2016/0300388 A1 | 10/2016 | Stafford | |
| 2017/0064384 A1* | 3/2017 | Sahoo ............... H04N 21/4335 | |
| 2017/0262635 A1 | 9/2017 | Strauss et al. | |
| 2017/0272435 A1 | 9/2017 | Hodge | |
| 2017/0272440 A1 | 9/2017 | Hodge | |

(56) References Cited

U.S. PATENT DOCUMENTS

2019/0037247 A1  1/2019  Hodge
2019/0069029 A1  2/2019  Petty
2019/0141164 A1  5/2019  Petty

OTHER PUBLICATIONS

DSKeye Gigabit Product Brief, Bitec Ltd. 2007; 2 pages.
Excerpt from Merriam-Webster's Collegiate Dictionary, Tenth Edition, 2002; p. 841.
Excerpt from the American Heritage Dictionary, 5th Ed. (2016); p. 679.
Excerpts from "iPhone: The Missing Manual," 6th ed., Sebastopol, CA: O'Reilly Media, 2012; 556 (submitted in 10 parts).
File History of U.S. Pat. No. 9,083,850, U.S. Appl. No. 13/931,857, filed Jul. 14, 2015.
Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.
International Search Report and Written Opinion directed to International Patent Appl. No. PCT/US2017/031317, dated Aug. 2, 2017; 16 pages.
International Search Report and Written Opinion directed to International Patent Application No. PCT/US2017/022163, dated Jun. 9, 2017; 12 pages.
Prosecution History of U.S. Pat. No. 8,929,525, U.S. Appl. No. 14/323,582, filed Jul. 3, 2014.
U.S. Appl. No. 61/801,861, filed Mar. 15, 2013; 77 pages.
OpenSong Getting Started. Online, retrieved from www.archive.org, Archive date: 2016; 6 pages.
ScoreCloud, Online, retrieved from www.archive.org, Archive date: 2016; 3 pages.
Censorship of Music (Wikipedia), retrieved from www.archive.org, Archive date: 2016; 15 pages.

\* cited by examiner

SYSTEMS AND METHODS FOR A VIDEO SHARING SERVICE WITHIN CONTROLLED ENVIRONMENTS

CROSS-REFERENCE TO RELATED APPLICATIONS

This application is a continuation of U.S. patent application Ser. No. 15/661,840, filed on Jul. 27, 2017, which is incorporated herein by reference in its entirety. This application is related to U.S. patent application Ser. No. 15/662,092, filed on Jul. 27, 2017 and U.S. patent application Ser. No. 15/662,103, filed on Jul. 27, 2017, which are each incorporated herein by reference in their entirety.

BACKGROUND

Field

The disclosure relates to systems and methods for a centralized video sharing service within controlled environments.

Background

In a controlled environment, such as a correctional facility, inmates have limited opportunities to interact with the outside world. Correctional facilities provide inmates with the ability to communicate with family and/or friends, browse websites using a mobile device, or interact with certain content. In some cases, administrators at correctional facilities may seek to provide opportunities for inmates to create and share media content. However, there may be a need for administrators to ensure that the media content is appropriate for distribution to inmates within the controlled environment. Further, administrators might not want to distribute media content or provide inmates with access to media content that could be used in support of illegal activities.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
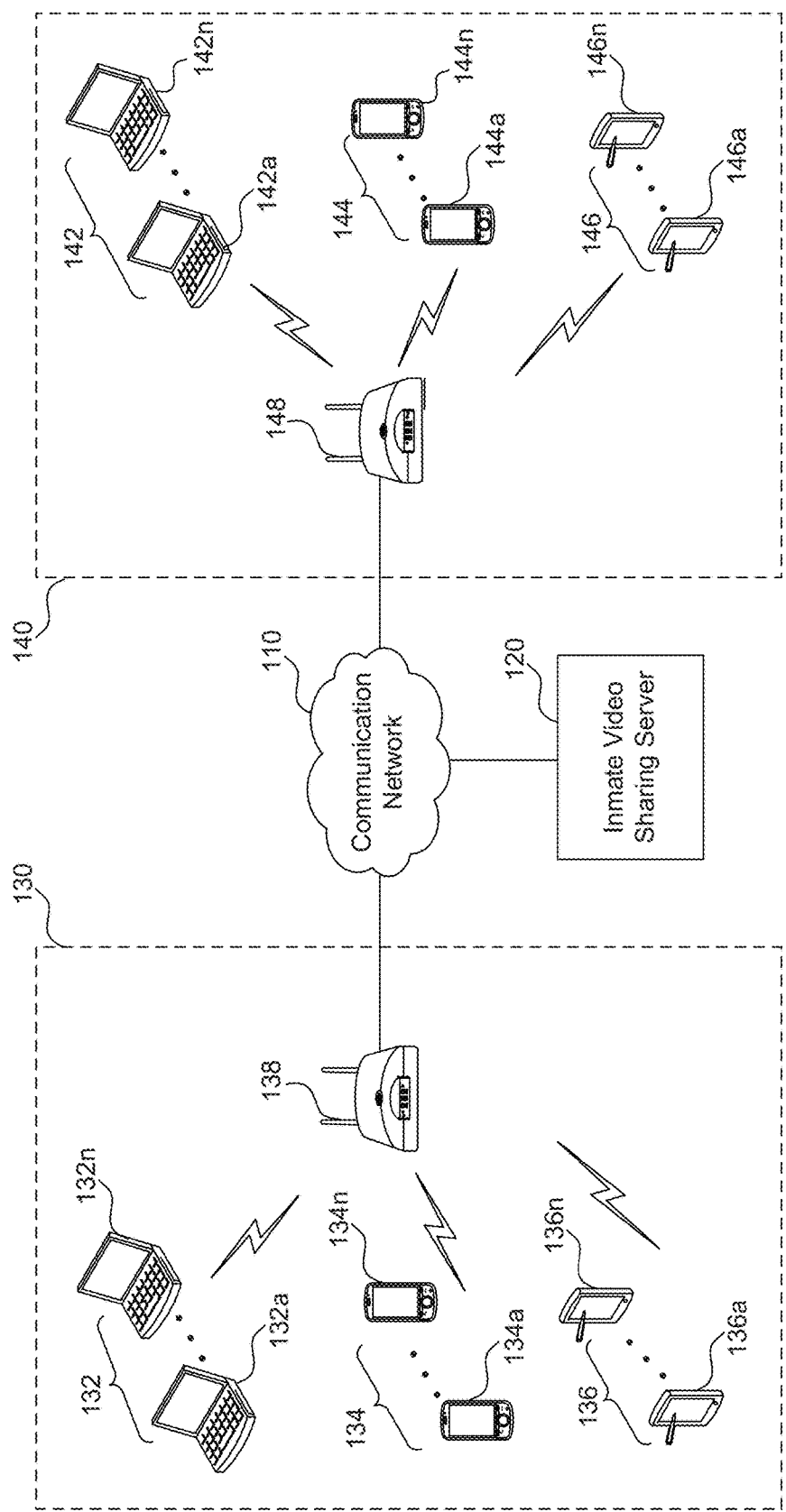
FIG. 1 illustrates a block diagram of an inmate video sharing system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," and the like, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, and the like), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, and the like. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Inmate Video Sharing System

FIG. 1 illustrates a block diagram of an inmate video sharing system 100, according to embodiments of the present disclosure. Inmate video sharing system 100 includes an inmate video sharing server 120 configured to receive and transmit communication data to and from a first inmate communication system 130 and a second inmate communication system 140 via a communication network 110. In this disclosure, communication data refers to data associated with video content that is uploaded to or streamed from inmate video sharing server 120 by a plurality of inmates in controlled environments (such as correctional facilities) using first inmate communication system 130 and second inmate communication system 140. For example, communication data includes the video content itself (e.g., a plurality of video frames for each video), as well as data related to the video, as will be described in further detail below.

Inmate video sharing server 120 manages video sharing services for inmates, including user registration of inmates for video sharing services, video content restrictions, video content ratings, authorization for publishing or hosting videos, search term restrictions for video content, and video content viewing on inmate communication devices in the first inmate communication system 130 and/or second inmate communication system 140, as will be described in further detail below. In some embodiments, the inmate video sharing server 120 may be a part of a distributed file storage system. For example, inmate video sharing server 120 provides a video sharing service that is implemented as a distributed file system in which the inmate video sharing system 100 allows access to files and/or videos shared from multiple hosts via communication network 110. In particular, inmate video sharing server 120 connects to first inmate communication system 130 and second inmate communication system 140 via communication network 110. Communication network 110 includes at least one of a private network, personal area network (PAN), local area network (LAN), wide area network (WAN), or the Internet.

In some embodiments, first inmate communication system 130 includes one or more communication devices available to inmates in a first correctional facility to create, edit, and upload videos to be hosted by inmate video sharing server 120. For example, inmates in the first correctional facility can create, edit, and upload videos that are accessible to inmates in other correctional facilities and/or in other jurisdictions by using one or more devices in the first inmate communication system 130. First inmate communication system 130 includes any or all devices, such as a plurality of computing devices 132 (e.g., computing devices 132a-132n), a plurality of mobile devices 134 (e.g., mobile devices 134a-134n), and a plurality of tablets 136 (e.g., tablets 136a-136n).

In some embodiments, computing devices 132, mobile devices 134, and/or tablets 136 may be referred to herein as first inmate communication devices. Computing devices 132 include desktops, laptops, netbooks and other portable computers, wearable computing devices, and/or any other computing device capable of sending and receiving communications from inmate video sharing server 120. Mobile devices 134 include smart phones and other mobile communication devices configured to upload and/or stream video content from inmate video sharing server 120. Tablets 136 include tablet computers and other wireless communication devices configured to upload and/or stream video content from inmate video sharing server 120.

In some embodiments, inmates in a first correctional facility are provided with access to at least one of computing devices 132, mobile devices 134, and tablets 136 located within the first correctional facility. Communications from computing devices 132, mobile devices 134, and/or tablets 136 are routed through a first wireless access point 138 (e.g., a first router), in which the first wireless access point 138 provides connectivity to computing devices 132, mobile devices 134, and/or tablets 136. In some embodiments, the connection between computing devices 132, mobile devices 134, and/or tablets 136 in the first inmate communication system 130, communication network 110, and inmate video sharing server 120 is a wireless connection (e.g., Bluetooth™, Wi-Fi connection, or the like) or a wired connection (e.g., Ethernet, universal serial bus (USB), or the like).

In additional embodiments, computing devices 132, mobile devices 134, and/or tablets 136 may be associated with and/or operated by employees, officers, and/or personnel of correctional facilities to create, edit, and/or upload video content to the inmate video sharing server 120. For example, employees of a correctional facility may wish to create videos, such as training videos, instructional or educational videos, and/or lecture videos of different subjects for educational purposes in the correctional facility. By utilizing computing devices 132, mobile devices 134, and/or tablets 136 to create and/or edit video content, correctional facility employees may upload videos to the inmate video sharing server 120 and share the videos with inmates and/or other personnel members in the same correctional facility or other correctional facilities in the city, county, state, or region.

In some embodiments, second inmate communication system 140 includes one or more communication devices available to inmates in a second correctional facility to access, rate, and/or watch videos hosted by inmate video sharing server 120. For example, inmates in the second correctional facility can view, rate, and/or comment on videos uploaded by inmates in the first correctional facility (e.g., via first inmate communication system 130) using one or more devices in the second inmate communication system 140. Second inmate communication system 140 includes any or all devices, such as a plurality of computing devices 142 (e.g., computing devices 142a-142n), a plurality of mobile devices 144 (e.g., mobile devices 144a-144n), and a plurality of tablets 146 (e.g., tablets 146a-146n). In some embodiments, second inmate communication system 140 represents communication devices in other nearby prisons, such as correctional facilities within the same county, state, jurisdiction, or the like.

In some embodiments, computing devices 142, mobile devices 144, and/or tablets 146 may be referred to herein as second inmate communication devices. Computing devices 142 include desktops, laptops, netbooks and other portable computers, wearable computing devices, and/or any other computing device capable of sending and receiving communications from inmate video sharing server 120. Mobile devices 144 include smart phones and other mobile communication devices configured to upload and/or stream video content from inmate video sharing server 120. Tablets 146 include tablet computers and other wireless communication devices configured to upload and/or stream video content from inmate video sharing server 120.

In some embodiments, inmates in a second correctional facility are provided with access to at least one of computing devices 142, mobile devices 144, and tablets 146 located within the second correctional facility. Communications from computing devices 142, mobile devices 144, and/or tablets 146 are routed through a second wireless access point 148 (e.g., a first router), in which the second wireless access point 148 provides connectivity to computing devices 142, mobile devices 144, and/or tablets 146. In some embodiments, the connection between computing devices 142, mobile devices 144, and/or tablets 146 in the second inmate communication system 140, communication network 110, and inmate video sharing server 120 is a wireless connection (e.g., Bluetooth™, Wi-Fi connection, or the like) or a wired connection (e.g., Ethernet, universal serial bus (USB), or the like).

In additional embodiments, computing devices 142, mobile devices 144, and/or tablets 146 may be associated with and/or operated by employees, officers, and/or personnel of correctional facilities to access, rate, comment on, and/or watch video content hosted by the inmate video sharing server 120. For example, employees of a correctional may wish to watch videos hosted by the inmate video sharing server 120, such as training videos, instructional videos, and/or lecture videos of different subjects for educational purposes in the correctional facility. Such videos may be uploaded to the inmate video sharing server 120 by other employees and/or inmates in the same correctional facility or other correctional facilities in the city, county, state, or region.

Inmate Video Sharing Server

Figure 2:
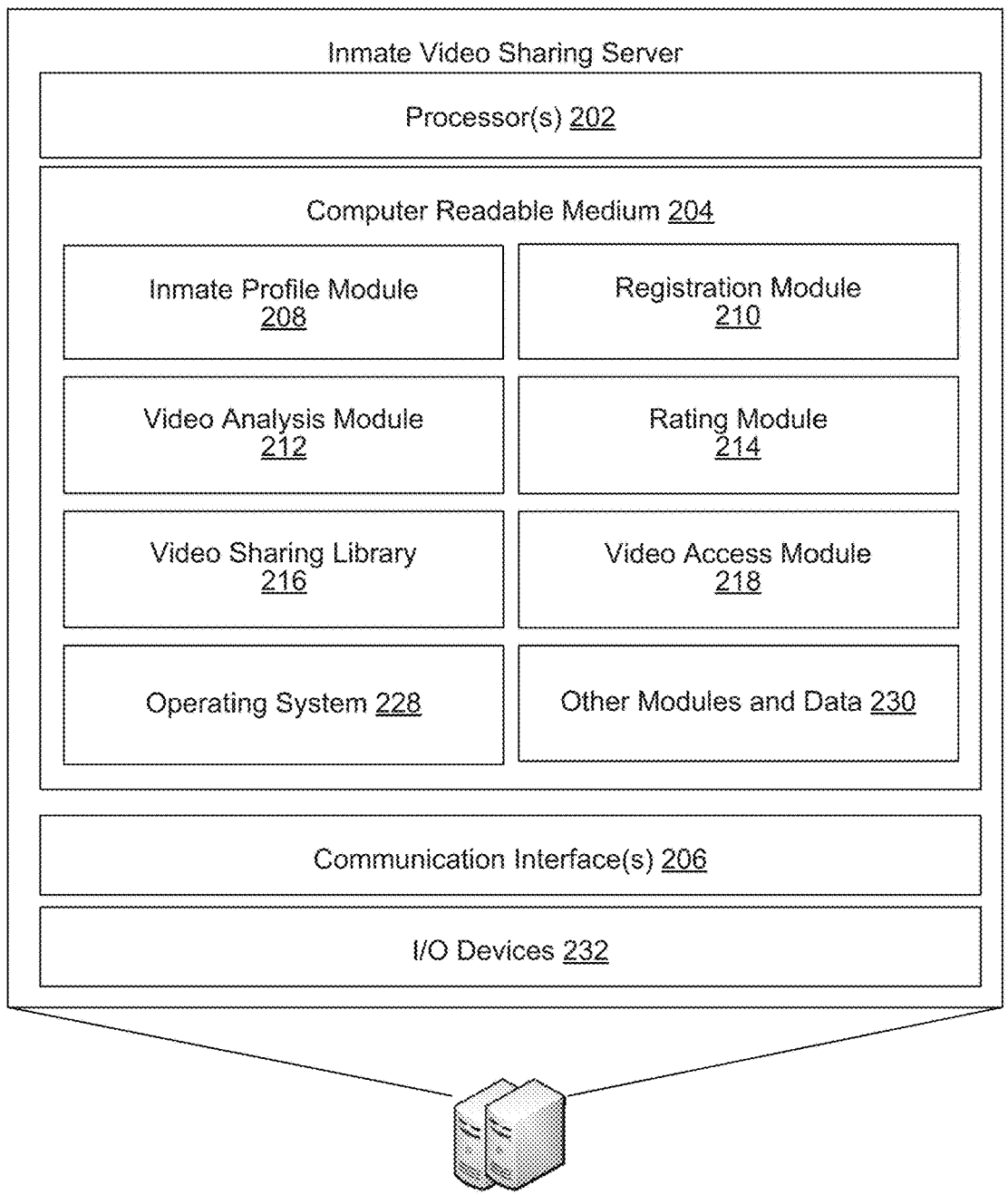
FIG. 2 illustrates a block diagram of an inmate video sharing server in the inmate video sharing system, according to embodiments of the present disclosure.

FIG. 2 illustrates a block diagram of the inmate video sharing server 200, according to embodiments of the present disclosure. Inmate video sharing server 200 represents an exemplary embodiment of inmate video sharing server 120 in FIG. 1. Inmate video sharing server 200 includes one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used.

Further, while the figures illustrate the components and data of the inmate video sharing server 200 as being present in a single location, these components and data may alternatively be distributed across different computing devices and different locations in any manner. Consequently, the functions may be implemented by one or more computing devices, with the various functionality described above distributed in various ways across the different computing devices. Multiple inmate video sharing servers 200 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the inmate video sharing server 200 includes one or more processors 202, one or more computer-readable media 204, and one or more communication interfaces 206. Each processor 202 is a single processing unit or a number of processing units, and may include single or multiple computing units or multiple processing cores. The processor(s) 202 can be implemented as one or more microprocessors, microcomputers, microcontrollers, digital signal processors, central processing units, state machines, logic circuitries, and/or any devices that manipulate signals based on operational instructions. For instance, the processor(s) 202 may be one or more hardware processors and/or logic circuits of any suitable type specifically programmed or configured to execute the algorithms and processes described herein. The processor(s) 202 can be configured to fetch and execute computer-readable instructions stored in the computer-readable media 204, which can program the processor(s) 202 to perform the functions described herein.

The computer-readable media 204 include volatile and nonvolatile memory and/or removable and non-removable media implemented in any type of technology for storage of information, such as computer-readable instructions, data structures, program modules, or other data. Such computer-readable media 204 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate video sharing server 200, the computer-readable media 204 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 204 is used to store any number of functional components that are executable by the processors 202. In many implementations, these functional components comprise instructions or programs that are executable by the processors and that, when executed, specifically configure the one or more processors 202 to perform the actions attributed above to the inmate video sharing server 200. In addition, the computer-readable media 204 store data used for performing the operations described herein.

In the illustrated example, the computer-readable media 204 further includes inmate profile module 208, registration module 210, video analysis module 212, rating module 214, video sharing library 216, and video access module 218. Inmate profile module 208 obtains and stores profile information (e.g., inmate profiles) corresponding to each inmate in one or more correctional facilities. In some embodiments, the inmate profiles of inmate profile module 208 may be additionally or alternatively stored in a database accessible to the inmate video sharing server 200 in the inmate video sharing system 100. In some embodiments, inmate profile module 208 obtains profile information related to the inmates from one or more of (a) a jail management system (JMS) or an offender management system (OMS) operated by the jurisdiction of the correctional facility, (b) public database containing information on the inmates, or (c) a questionnaire provided by a web page, a personal approved number (PAN) list, or booking information.

In some embodiments, inmate profile module 208 includes personal information corresponding to each inmate, including authentication information, demographic information, biometric information, addresses of previous residences or correctional facilities, behavioral history (e.g., behaviors of an inmate at the correctional facility during his or her sentence), gang affiliations, related legal personnel (e.g., judges, prosecuting attorneys, victims associated with legal proceedings against each inmate, witnesses associated with legal proceedings against each inmate, and the like), languages/dialects spoken by each inmate, names of family members, incident reports (e.g., including previous incidents with other inmates and/or correctional facility employees), visitor logs, and the like.

In some cases, inmate profile module 208 also stores data regarding each inmate's video sharing service account, including video uploading history, video sharing and/or viewing history, device usage history, video content from which the inmate is restricted, rating values of videos the inmate is permitted to watch, and the like). At least one of registration module 210, video analysis module 212, rating module 214, video sharing library 216, and/or video access module 218 communicates with inmate profile module 208 for authenticating inmates, verifying user credentials provided during registration (e.g., username, password, identification number, and the like), creating video sharing service accounts, identifying types of restricted video content in videos based on inmate profiles, determining restricted search terms for inmates based on inmate profiles, and the like.

Registration module 210 manages registration of inmates for the video sharing service provided by inmate video sharing server 200. In some embodiments, registration module 210 receives registration requests from inmate communication devices (e.g., computing devices 132 or 142, mobile devices 134 and/or 144, or tablets 136 and/or 146) for inmates in correctional facilities who wish to register for accounts with the video sharing service. For example, inmates may need to register for an account with the video sharing service before they are permitted to create, edit, upload, and/or view videos through the inmate video sharing server 200. In some cases, a registration request from an inmate includes authentication information corresponding to the inmate, such as authentication/user credentials, user identifiers, device identifiers, passwords, certificates, cookies, tokens, and the like.

For example, in a registration request, the inmate provides user credentials to set up a video sharing account, such as a username, password, and an identification number associated with the inmate (e.g., assigned by the correctional facility). Registration module 210 receives such registration requests and verifies or authenticates the user credentials by matching the user credentials with personal information in the inmate profile module 208. For example, registration module 210 may utilize an identification number provided in a registration request to retrieve an inmate profile corresponding to the inmate from the inmate profile module 208 and determine if the inmate has been authorized or approved by the jurisdiction or correctional facility to register for and use the video sharing service. In some cases, the jurisdiction or correctional facility solely authorizes inmates who have exhibited good behaviors or conduct at the correctional facility to register for and use the video sharing service. For example, good behaviors or conduct for an inmate include the inmate following the rules and policies and also avoiding one or more prohibited activities in the correctional facility that are predetermined by the jurisdiction. In some cases, inmates who exhibit bad behaviors or conduct at the correctional facility are denied access and unauthorized to use the video sharing service. Bad behaviors or conduct include the inmate engaging in prohibited activities or infractions within the correctional facility, such as altercations with other inmates or correctional facility officers/guards.

If the inmate has not been authorized to register for and/or use the video sharing service, then the registration module 210 notifies the inmate of the failed registration attempt and indicates that the inmate is not permitted to use the video sharing service. If the inmate has been authorized, then the registration module 210 proceeds with creating an account for the inmate utilizing the username, password, and/or credentials provided in the registration request. For example, the registration module 210 creates an account for the inmate by generating a personal identification number (PIN) for the inmate for accessing the video sharing service and associating the PIN with the account for the inmate. In some cases, the registration module 210 and/or the inmate profile module 208 stores the data association of the PIN with the account for the inmate, as well as account information (e.g., including username and password for the account, PIN, video uploading history, video sharing/viewing history, device usage history, and the like). After registration, the inmate may utilize the account information, such as at least one of the PIN, username, and password, to login to his or her inmate video sharing account on his or her inmate communication device and create, edit, upload, or view videos hosted by the inmate video sharing server 200. In some cases, registration module 210 also manages user logins after the inmate has registered and performs authentication of inmates prior to uploading or viewing videos.

Video analysis module 212 performs analysis of inmate videos and determines the presence of restricted content in videos. In some embodiments, video analysis module 212 receives upload requests to upload videos, processes videos, and analyzes audio and video content from videos of inmates to determine whether the audio and video content is in accordance with rules and regulations set by the jurisdiction operating the correctional facility. For example, video analysis module 212 utilizes image processing, machine learning models, and/or other pattern recognition techniques to learn or identify audio and video content that complies with the jurisdiction and audio and video content that is restricted or disallowed by the jurisdiction. Based on the data collected and identified from at least one of the image processing, machine learning models, and other pattern recognition techniques, video analysis module 212 compiles a data store of restricted information to utilize for determining the presence of restricted content in inmate.

The data store of restricted information includes prohibited image features (e.g., text captions, text overlay, and the like), prohibited video features, prohibited body movements (e.g., obscene gestures, gang signs, and the like), prohibited location information (e.g., GPS data or coordinates) identifying geographic locations that are not permitted to be captured, and prohibited words, phrases, terms, and/or subject matters in a variety of languages and/or dialects. For example, restricted information in videos includes profanity, vulgarity, slurs, obscenities, nudity, obscene text captions, obscene or offensive gestures, racial epithets or gestures, threats of violence, violent behaviors, or video content associated with criminal activity. In some cases, video analysis module 212 updates the data store of restricted information periodically (e.g., every 2 hours, every day, every week, every month, or the like) based on the results of applying image processing, machine learning models, and other pattern recognition techniques to video content received from inmates over time. Video analysis module 212 also updates the data store based on input or feedback received from employees, officers, and/or personnel of the correctional facility who may additionally monitor video content for restricted information. By compiling and updating restricted information in the data store, video analysis module 212 determines the presence of restricted content in videos of inmates in a dynamic and systematic manner.

In some embodiments, video analysis module 212 also interfaces with inmate profile module 208 to identify personal information of an inmate and determine whether a video by the inmate includes restricted information based on the inmate's personal information. For example, video analysis module 212 may parse personal information or behavioral history data of the inmate (e.g., obtained from inmate profile module 208) to identify an incident report regarding an alleged incident between the inmate and a correctional facility officer. Video analysis module 212 may then analyze the content of the video, including audio of the video, using speech recognition techniques to determine that the inmate is communicating about the alleged incident and/or making violent threats to the correctional facility officer in the video. For example, video analysis module 212 converts spoken word in the audio of the video into computer readable text, in which the computer readable text is then monitored and analyzed by video analysis module 212 for key words and/or phrases that are associated with the incident report from the alleged incident between the inmate and the correctional facility officer. By identifying key words and/or phrases in the audio of the video corresponding to restricted information, video analysis module 212 determines the presence of restricted video content in videos and communicates with rating module 214.

Rating module 214 assigns and manages video ratings of inmate videos based on restricted video content. In some embodiments, rating module 214 receives data regarding the presence or absence of restricted content in inmate videos from video analysis module 212. For example, video analysis module 212 transmits a notification to the rating module 214 indicating whether or not a video from an inmate includes restricted content and data regarding the specific content in the video identified as restricted. If the video includes restricted content, the rating module 214 receives data regarding the type of restricted content in the video, such as identified profanity, vulgarity, slurs, obscenities, nudity, obscene text captions, obscene or offensive gestures, racial epithets or gestures, threats of violence, violent behaviors, video content associated with criminal activity, or any other video content associated with restricted information identified from inmate profile module 208.

Upon receiving the indication and/or restricted content of a video from the video analysis module 212, rating module 214 determines what rating value to assign the video. For example, rating module 214 assigns ratings to inmate videos based on a numerical scale, such as a scale from 1 to 10. In some cases, a rating value of 1 indicates that a video does not include any restricted content. For example, if the rating module 214 receives a notification from the video analysis module 212 indicating that the video does not include any restricted content, then the rating module 214 assigns a rating value of 1 to the video. In other cases, a rating value of 10 indicates that a video includes a high level of restricted content, and rating values of 2-9 indicate levels of restricted content in between. A higher rating value indicates more restricted content present in the video in comparison to a video with a lower rating value. In some embodiments, the rating module 214 assigns ratings to videos based on the type(s) of restricted content in each video and the number of instances or times that the restricted content occurs in each video. For example, a first video with racial epithets throughout the entirety of the first video (e.g., in every minute of the first video) is assigned a higher rating value than a second video with two or three obscenities in the second video. Thus, rating module 214 uses the restricted content identified by the video analysis module 212 and the video analysis and processing performed by video analysis module 212 in order to assign ratings to videos accordingly.

Additionally, rating module 214 determines whether the assigned rating value of each inmate video is below or above a predefined threshold rating value. In some embodiments, rating module 214 utilizes the predefined threshold rating value to assess whether an inmate video rating is within the rating threshold or limit that is mandatory for videos to be uploaded to the inmate video sharing server 200. For example, videos with rating values below the predefined threshold may have a limited amount of restricted content which may be censored or filtered (e.g., by rating module 214) prior to uploading to the inmate video sharing server 200, whereas videos with rating values above or equal to the predefined threshold rating value might not be uploaded to the inmate video sharing server 200 as a result of a high level of restricted content throughout the video. Such videos with a high level of restricted content may need to be flagged for review by one or more employees of the correctional facility.

Video sharing library 216 manages video uploading, including publishing and/or hosting of videos on the inmate video sharing server 200. In some embodiments, video sharing library 216 receives video content and video ratings from the rating module 214 and/or video analysis module 212 and publishes videos, including the video content and video ratings, to the inmate video sharing server 200. Video sharing library 216 includes video content uploaded by a plurality of inmates in various correctional facilities, as well as metadata associated with the video content. For example, metadata associated with video content as referred to herein includes one or more attributes of the video content, such as a title of the video content, a filename of the video content, name of the creator of the video content, resolution, duration, dimensions, device identifier of a device that captured the video content, usage and licensing rights, location data identifying a location where the video content was captured, data and time information identifying when the video content was captured, video capturing device settings, thumbnail of the video content, and the like.

In some embodiments, videos are not uploaded to the inmate video sharing server 200 (e.g., by processor(s) 202 of inmate video sharing server 200) and published on the video sharing library 216 until after each video has been analyzed, reviewed for restricted content by video analysis module 212, and rated by rating module 214. In other embodiments, all videos received from inmates in upload requests (e.g., from computing devices 132 or 142, mobile devices 134 and/or 144, and tablets 136 and/or 146) are uploaded to inmate video sharing server 200 but marked as private or hidden from view by other inmates (e.g., via video sharing library 216) until after video analysis and rating are performed by video analysis module 212 and rating module 214, respectively. In such cases, after video analysis and rating has occurred, videos are removed from the inmate video sharing server 200 if the rating of each video is above or equal to the predefined threshold rating value. If the rating of each video is below the predefined threshold rating value, then videos are made public and/or published to the video sharing library 216, such that inmates may search for and view the videos for which they are authorized to view through the video sharing service.

In additional embodiments, individuals who have been approved by the jurisdiction or correctional facility may send and receive videos to and from the video sharing library 216 using inmate communication devices (e.g., computing devices 132 or 142, mobile devices 134 and/or 144, and tablets 136 and/or 146). For example, approved individuals include one or more teachers, family members, clergy members, mentors, attorneys, friends, or other individuals who have been approved by the jurisdiction to participate in the video sharing service. In some cases, videos uploaded by approved individuals to the video sharing library 216 are set to private as a default setting or marked as private by approved individuals or administrators after uploading. For example, administrators of the video sharing service with privileges in the video sharing library 216 may modify the settings of videos to make uploaded videos public, such that other inmates and/or approved individuals may search for the public videos.

Video access module 218 manages video accessibility and video searching for inmates based on ratings and inmate profiles. In some embodiments, video access module 218 receives viewing requests from inmate communication devices (e.g., computing devices 132 or 142, mobile devices 134 and/or 144, or tablets 136 and/or 146) of inmates requesting to view various videos published to the video sharing library 216. Video access module 218 determines which videos each inmate is allowed to access based on at least one of video ratings from rating module 214 and inmate profiles from inmate profile module 208. For example, video access module 218 identifies the rating value of a video (e.g., retrieved from rating module 214) to determine whether an inmate is allowed to view the video with the identified rating value. For example, certain inmates may be permitted to watch videos with higher rating values (e.g., videos with more restrictive content) than other inmates.

Video access module 218 communicates with inmate profile module 208 to identify which rating values the inmate is permitted to watch. For example, a first inmate may be permitted to view videos with rating values ranging from 1-5, whereas a second inmate may be permitted to view videos with rating values that are less than or equal to a 2. In some cases, each rating value corresponds to a different level and/or a different type of restricted content in the video. For example, a type of restricted content includes at least one of profanity, obscenity, nudity, violence, and video content associated with gang affiliations, previous incidents with other inmates and employees of the correctional facility, and/or legal personnel of the inmate. Thus, video access module 218 accesses an inmate profile to identify what types of restricted content that the inmate is permitted to view and/or restricted from viewing, and determines whether the rating value of a video requested for viewing corresponds to the type of restricted content identified in the inmate profile. For example, a first inmate may be permitted to view videos with obscenities and/or videos with nudity, whereas a second inmate may also be permitted to view videos with obscenities but restricted from viewing videos with nudity. Accordingly, video access module 218 provides the inmate device of the first inmate with access to view videos with obscenities and blocks the inmate device of the second inmate from accessing videos with nudity.

In some embodiments, video access module 218 also determines restricted search terms to restrict each inmate from searching for in the video sharing service based on inmate profiles retrieved from inmate profile module 208. For example, video access module 218 parses an inmate profile of each inmate to identify personal information of the inmate including at least one of gang affiliations, previous incidents with other inmates and/or correctional facility employees, and legal personnel of the inmate. Video access module 218 determines restricted search terms to restrict the inmate from searching for in the video sharing library 216 based on the personal information of the inmate. For example, the restricted search terms include at least one of words, phrases, or names corresponding to the personal information of the inmate, such as names of gang members with whom the inmate is affiliated, rival gang members of the inmate, witnesses associated with legal proceedings against the inmate, judges, prosecuting attorneys, victims associated with legal proceedings against the inmate, other inmates and/or correctional facility employees with whom the inmate has had incidents or altercations, and the like.

In some embodiments, the restricted search terms are customized and tailored for each inmate based on each inmate's personal information. Each inmate in a correctional facility may have a unique set of restricted search terms, in which each set of restricted search terms differs from each other. In some cases, there may be overlapping restricted search terms, and the restricted search terms in a first inmate's set of restricted search terms may be the same as or similar to restricted search terms in a second inmate's set of restricted search terms. In some embodiments, video access module 218 associates data regarding the set of restricted search terms for each inmate with an account for each inmate, resulting in a data association. The video access module 218 and/or the inmate profile module 208 stores the data association of the set of restricted search terms for the inmate with the account information for each inmate. Accordingly, video access module 218 utilizes each set of restricted search terms to determine content for which each inmate can search in the video sharing library 216. In some embodiments, video access module 218 receives video search requests for searches in the video sharing library 216 from inmate communication devices of inmates (e.g., computing devices 132 or 142, mobile devices 134 and/or 144, or tablets 136 and/or 146).

For each search request, video access module 218 identifies whether at least one restricted search term is included in the search request for the inmate. If a restricted search term is included in a search request, then video access module 218 restricts the inmate device from viewing one or more search results corresponding to the at least one restricted search term in the search request. Video access module 218 also transmits a notification to the inmate device indicating that the inmate is restricted from searching for the restricted search term. The inmate device is further restricted from transmitting additional search requests including the one or more restricted search terms to the video access module 218. If none of the restricted search terms are included in the search request, then video access module 218 transmits the search results corresponding to the search request to the inmate device. The inmate may subsequently select and view videos provided in the search results on his or her inmate device. By determining search term restrictions, video access module 218 manages video access to inmates efficiently and prevents inmates from searching for and/or viewing restricted content.

Additional functional components stored in the computer-readable media 204 include an operating system 228 for controlling and managing various functions of the inmate video sharing server 200. The inmate video sharing server 200 also includes or maintains other functional components and data, such as other modules and data 230, which include programs, drivers, and the like, and the data used or generated by the functional components. Further, the inmate video sharing server 200 includes many other logical, programmatic and physical components, of which those described above are merely examples that are related to the discussion herein.

The communication interface(s) 206 include one or more interfaces and hardware components for enabling communication with various other devices, including communication devices operated by inmates and/or correctional facility personnel, such as computing devices 132 or 142, mobile devices 134 and/or 144, and/or tablets 136 and/or 146, or other computing devices, over communication network 110. For example, communication interface(s) 206 facilitate communication through one or more of the Internet, cable networks, cellular networks, wireless networks (e.g., Wi-Fi, cellular) and wired networks. As several examples, the inmate video sharing server 200 and communication devices communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, and the like. The inmate video sharing server 200 may further be equipped with various input/output (I/O) devices 232. Such I/O devices include a display, various user interface controls (e.g., buttons, joystick, keyboard, mouse, touch screen, and the like), audio speakers, connection ports and so forth.

Inmate Device

Figure 3:
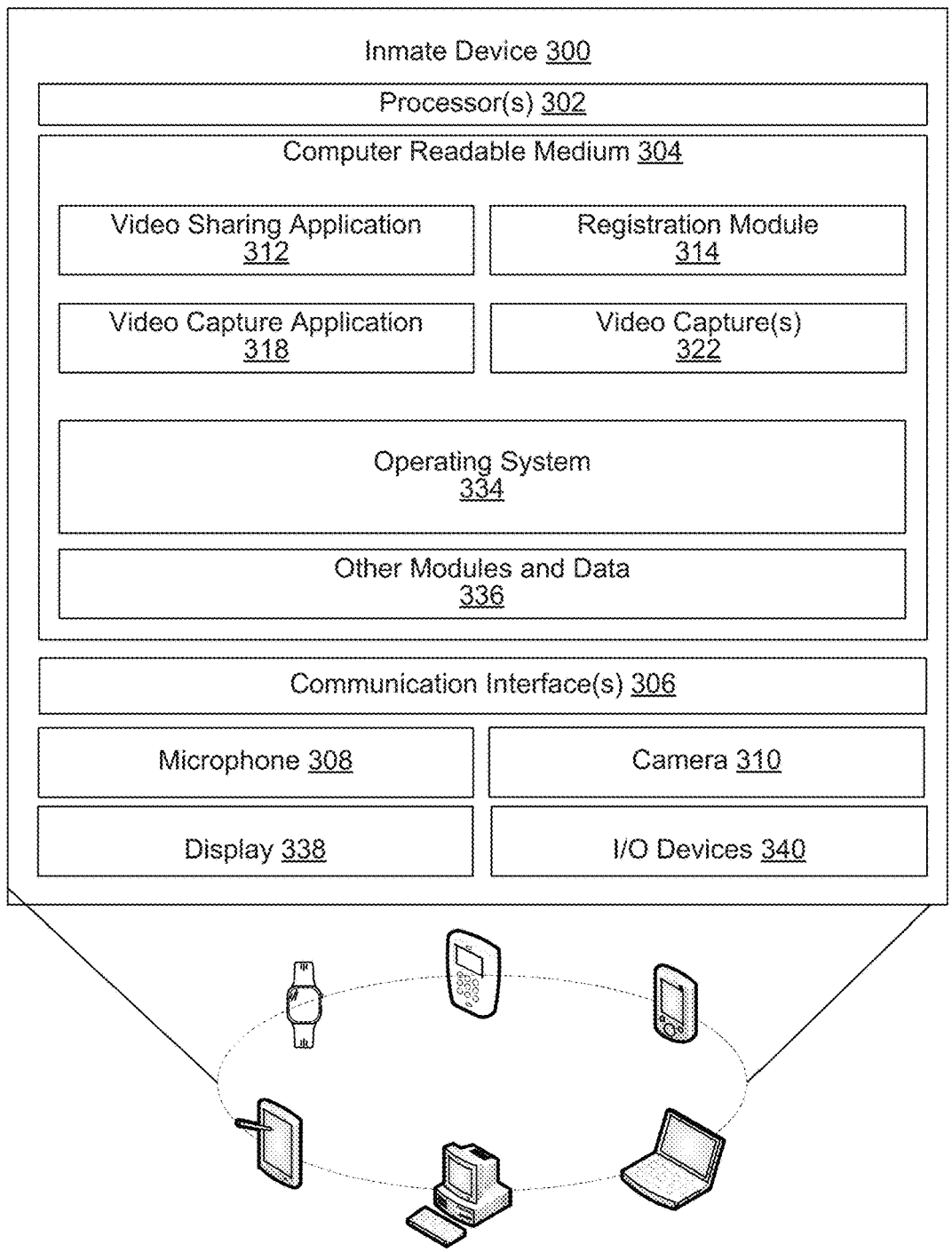
FIG. 3 illustrates a block diagram of an inmate device, according to embodiments of the present disclosure.

FIG. 3 illustrates a block diagram of an inmate device 300, according to embodiments of the present disclosure. Inmate device 300 represents an exemplary embodiment of an inmate communication device, such as computing device 132 or 142, mobile device 134 or 144, or tablet 136 or 146 in FIG. 1. Some examples of inmate device 300 include smart phones and mobile communication devices, tablet computing devices, desktops, laptops, netbooks and other portable computers, wearable computing devices, and any other portable device capable of sending communications and performing the functions according to the techniques described herein.

In the illustrated example, the inmate device 300 includes one or more processors 302, one or more computer-readable media 304, one or more communication interfaces 306, a microphone 308, and a camera 310. Each processor 302 is a single processing unit or a number of processing units, and may include single or multiple computing units or multiple processing cores. The processor(s) 302 can be implemented as one or more microprocessors, microcomputers, microcontrollers, digital signal processors, central processing units, state machines, logic circuitries, and/or any devices that manipulate signals based on operational instructions. For instance, the processor(s) 302 may be one or more hardware processors and/or logic circuits of any suitable type specifically programmed or configured to execute the algorithms and processes described herein. The processor(s) 302 can be configured to fetch and execute computer-readable instructions stored in the computer-readable media 304, which can program the processor(s) 302 to perform the functions described herein.

The computer-readable media 304 include volatile and nonvolatile memory and/or removable and non-removable media implemented in any type of technology for storage of information, such as computer-readable instructions, data structures, program modules, or other data. Such computer-readable media 304 include, but are not limited to, RAM, ROM, EEPROM, flash memory or other memory technology, optical storage, solid state storage, magnetic tape, magnetic disk storage, network attached storage, storage area networks, cloud storage, or any other medium that can be used to store the desired information and that can be accessed by a computing device. Depending on the configuration of the inmate device 300, the computer-readable media 304 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 304 is used to store any number of functional components that are executable by the processors 302. In many implementations, these functional components comprise instructions or programs that are executable by the processors and that, when executed, specifically configure the one or more processors 302 to perform the actions described herein below. In addition, the computer-readable media 304 store data used for performing the operations described herein below.

In the illustrated example, the computer-readable media 304 includes video sharing application 312, registration module 314, video capture application 318, and video capture(s) 322. Video sharing application 312 is an application on the inmate device 300 that provides media player functionality, such as playing audio and video of video content uploaded by inmates. For example, video sharing application 312 displays the video content of video sharing library 216 in any suitable arrangement (e.g., linear, carousel, grid, and the like.). Some examples of supported file formats include AVI, MPEG, ASF, WMV, WMA, MOV, 3GP, OGG, OGM, MKV, WAV, AC, AC3, FLAC, FLV, F4V, MP4, or the like.

Video sharing application 312 also allows inmates to transmit upload requests for uploading videos to the inmate video sharing server 200. Additionally, inmates can use video sharing application 312 to share videos from video sharing library 216 with other inmates at the same correctional facility or a different correctional facility. For example, video sharing application 312 can transmit messages to inmate devices 300 of other inmates, in which the messages include one or more links (e.g., uniform record locators (URLs) or hyperlinks) to videos on the video sharing library 216. By selecting the links in the messages, inmates can view videos shared by others on their respective inmate devices 300.

Registration module 314 provides inmates with functionality for registering for the video sharing service. For example, inmates utilize registration module 314 to submit registration requests to the inmate video sharing server 200 in order to register for accounts with the video sharing service. Registration requests transmitted by registration module 314 include authentication information corresponding to each inmate, such as authentication/user credentials, user identifiers, device identifiers, passwords, certificates, cookies, tokens, and the like.

Video capture application 318 is another application on the inmate device 300 that allows inmates to edit, capture or record video content for videos (e.g., using video capture 322) to be uploaded to the inmate video sharing server 200 by video sharing application 312. For instance, video capture application 318 provides functionality for editing video content, including cropping or trimming video content, rotating at least a portion of video content, marking up or annotating video content, adding transitions between video content, labeling video content, applying special effects (e.g., filters) to video content, re-sequencing video content to generate movies, creating a playlist of video content, and the like. In some embodiments, video sharing application 312 and video capture application 318 may be integrated into a single application that provides video capture, video editing, and video sharing functionalities.

Video capture 322 refers to video content data captured by a recording device (e.g., camera 310) via an application of the inmate device 300, such as video capture application 318. Once the inmate device 300 stores video content data (e.g., video capture 322), the inmate device 300 can send the video content data to the inmate video sharing server 200 to be added to the video sharing library 216 after video processing and analysis.

Additional functional components stored in the computer-readable media 304 include an operating system 334 for controlling and managing various functions of the inmate device 300. The inmate device 300 also includes or maintains other functional components and data, such as other modules and data 336, which include programs, drivers, and the like, and the data used or generated by the functional components. Further, the inmate device 300 includes many other logical, programmatic and physical components, of which those described above are merely examples that are related to the discussion herein.

The communication interface(s) 306 includes one or more interfaces and hardware components for enabling communication with various other devices, such as the inmate video sharing server 120, inmate video sharing server 200, or other computing devices, over the communication network 110. For example, communication interface(s) 306 facilitates communication through one or more of the Internet, cable networks, cellular networks, wireless networks (e.g., Wi-Fi, cellular) and wired networks. As several examples, the inmate video sharing server 200 and the inmate device 300 communicate and interact with one another using any combination of suitable communication and networking protocols, such as Internet protocol (IP), transmission control protocol (TCP), hypertext transfer protocol (HTTP), cellular or radio communication protocols, and so forth. Examples of communication interface(s) include a modem, a network interface (such as an Ethernet card), a communications port, a PCMCIA slot and card, and the like.

Inmate device 300 further includes a display 338. Depending on the type of computing device used as the inmate device 300, the display 338 may employ any suitable display technology. For example, the display 338 may be a liquid crystal display, a light emitting diode display, or any other suitable type of display able to present digital content thereon. In some embodiments, the display 338 includes touch sensor with the display 338 to provide a touchscreen display configured to receive touch inputs for enabling interaction with a graphic interface presented on the display 338. Accordingly, implementations herein are not limited to any particular display technology.

Furthermore, the inmate device 300 is equipped with various input/output (I/O) devices 340. Such I/O devices 340 include a display, various user interface controls (e.g., buttons, joystick, keyboard, mouse, touch screen, and the like), audio speakers, connection ports, sensors (e.g., accelerometer, gyroscope, a compass, localization sensors, photometer, magnetometer, and the like), and so forth. Additionally, the inmate device 300 includes various other components that are not shown, examples of which include removable storage, a power source, such as a battery and power control unit, and so forth.

System Operation

Operations of registering inmates for video sharing service, allowing inmates to upload video content, allowing inmates to view uploaded video content, restricting search terms for inmates accessing video content in the video sharing service in correctional facilities through inmate video sharing system 100 will be described with respect to FIGS. 4, 5, and 6. Although the physical devices and components that form the system have largely already been described, additional details regarding their more nuanced operation will be described below with respect to FIGS. 1-3. While FIGS. 4-6 contain methods of operation of through the inmate video sharing server 200 and the inmate device 300, the operations are not limited to the order described below, and various operations can be performed in a different order. Further, two or more operations of each method can be performed simultaneously with each other.

Figure 4:
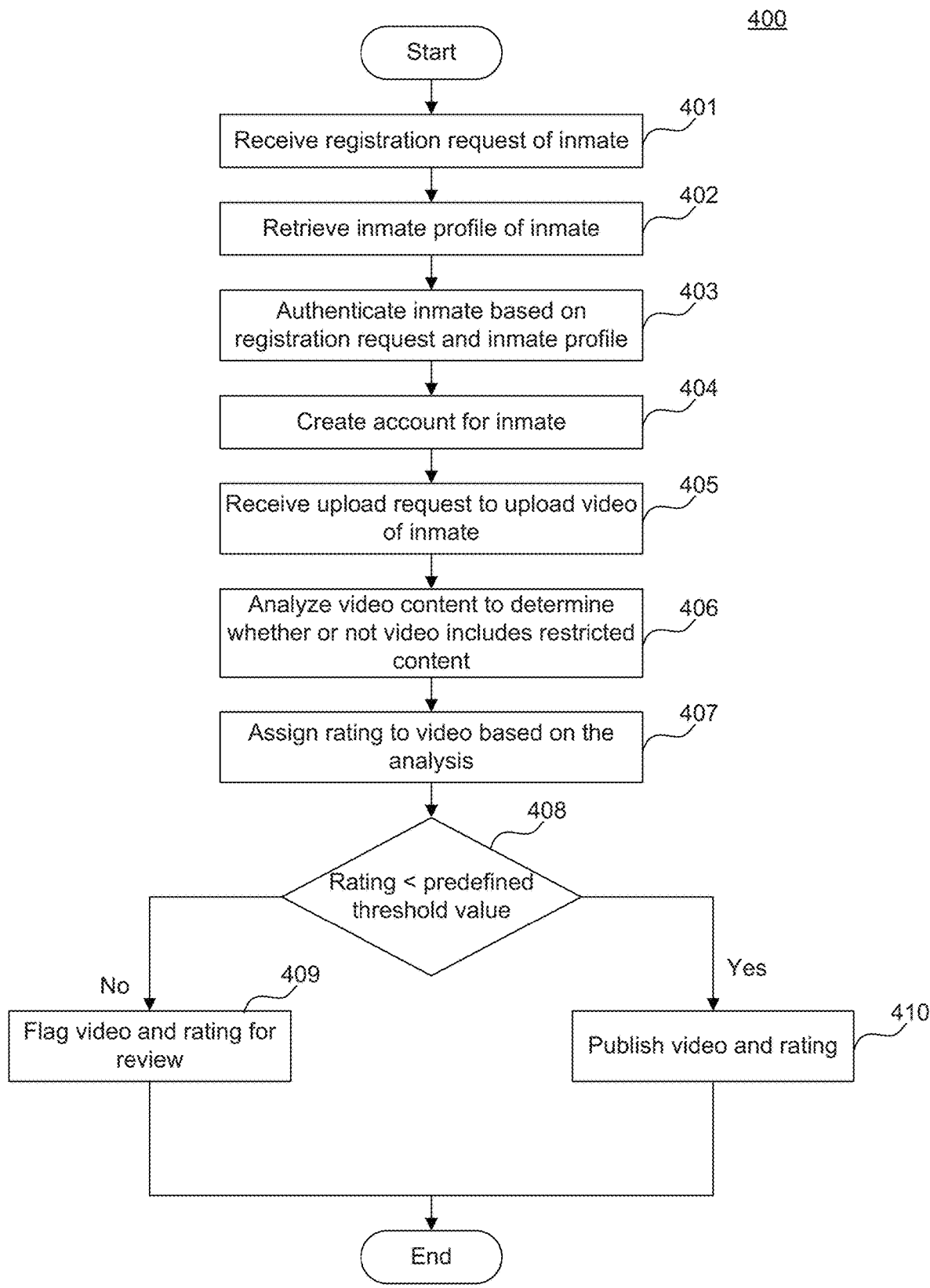
FIG. 4 illustrates a flowchart diagram of a method for registering inmates for video sharing service and allowing inmates to upload video content, according to embodiments of the present disclosure.

FIG. 4 illustrates a flowchart diagram of a method 400 of registering inmates for video sharing service and allowing inmates to upload video content, via an inmate video sharing server, such as inmate video sharing server 200 of FIG. 2, according to embodiments of the present disclosure. The steps of method 400 are performed by modules of inmate video sharing server 200, such as inmate profile module 208, registration module 210, video analysis module 212, rating module 214, video sharing library 216, and/or video access module 218. Method 400 of FIG. 4 begins with step 401 of receiving a registration request of an inmate. For example, the registration module 210 of inmate video sharing server 200 receives a registration request from inmate device 300 for registration of an inmate for video sharing service in a correctional facility (e.g., via first inmate communication system 130 or second inmate communication system 140).

At step 402, the inmate video sharing server retrieves an inmate profile of the inmate. For example, the registration module 210 of inmate video sharing server 200 retrieves the inmate profile of the inmate from the inmate profile module 208, in which the inmate profile includes personal information of the inmate. At step 403, the inmate video sharing server authenticates the inmate based on the registration request and the inmate profile of the inmate. For example, the registration module 210 of inmate video sharing server 200 authenticates the inmate by matching user credentials provided in the registration request with user credentials/personal information included in the inmate profile. At step 404, the inmate video sharing server creates an account for the inmate. For example, the registration module 210 of inmate video sharing server 200 creates an account for the inmate for the video sharing service in response to authentication of the inmate.

At step 405, the inmate video sharing server receives an upload request to upload a video of the inmate. For example, the video sharing library 216 and/or video analysis module 212 of inmate video sharing server 200 receives an upload request from inmate device 300 to upload a video of the inmate to the video sharing library 216. At step 406, the inmate video sharing server analyzes video content to determine whether or not the video includes restricted content.

For example, the video analysis module 212 of inmate video sharing server 200 analyzes the video content by using image processing, machine learning models, and/or other pattern recognition techniques to determine whether or not the video includes any restricted content that matches with data compiled in a data store of restricted information.

At step 407, the inmate video sharing server assigns a rating to the video based on the analysis in step 406. For example, the rating module 214 of inmate video sharing server 200 assigns a rating value to the video corresponding to the determination of whether or not the video includes restricted content. In some cases, the rating module 214 receives data regarding the presence or absence of restricted content in inmate videos from video analysis module 212, and the rating module 214 assigns a rating value to the video based on a numerical scale from 1 to 10 corresponding to the level of restricted content in the video. For example, a rating value of 1 indicates that the video does not include any restricted content, a rating value of 10 indicates that the video includes a high level of restricted content, and rating values of 2-9 indicate levels of restricted content in between.

At step 408, the inmate video sharing server determines whether or not the assigned rating value of the video is less than a predefined threshold value. For example, the rating module 214 of inmate video sharing server 200 determines whether the assigned rating value of the video is less than the predefined threshold value or greater than or equal to the predefined threshold value. In some cases, the predefined threshold value corresponds to a rating limit that is mandatory for an inmate video to comply with prior to being uploaded and/or published to the inmate video sharing server 200. If the rating value of the video is greater than or equal to the predefined threshold value, then method 400 in this example proceeds to step 409. At step 409, the inmate video sharing server flags the video and rating for review. For example, the rating module 214 of inmate video sharing server 200 flags the video and corresponding rating for review by one or more employees of the correctional facility. If the rating value of the video is less than the predefined threshold value, then method 400 in this example proceeds to step 410. At step 410, the inmate video sharing server uploads and/or publishes the video and the rating. For example, inmate video sharing server 200 uploads and/or publishes the video and the rating to the video sharing library 216 of the inmate video sharing server 200.

Figure 5:
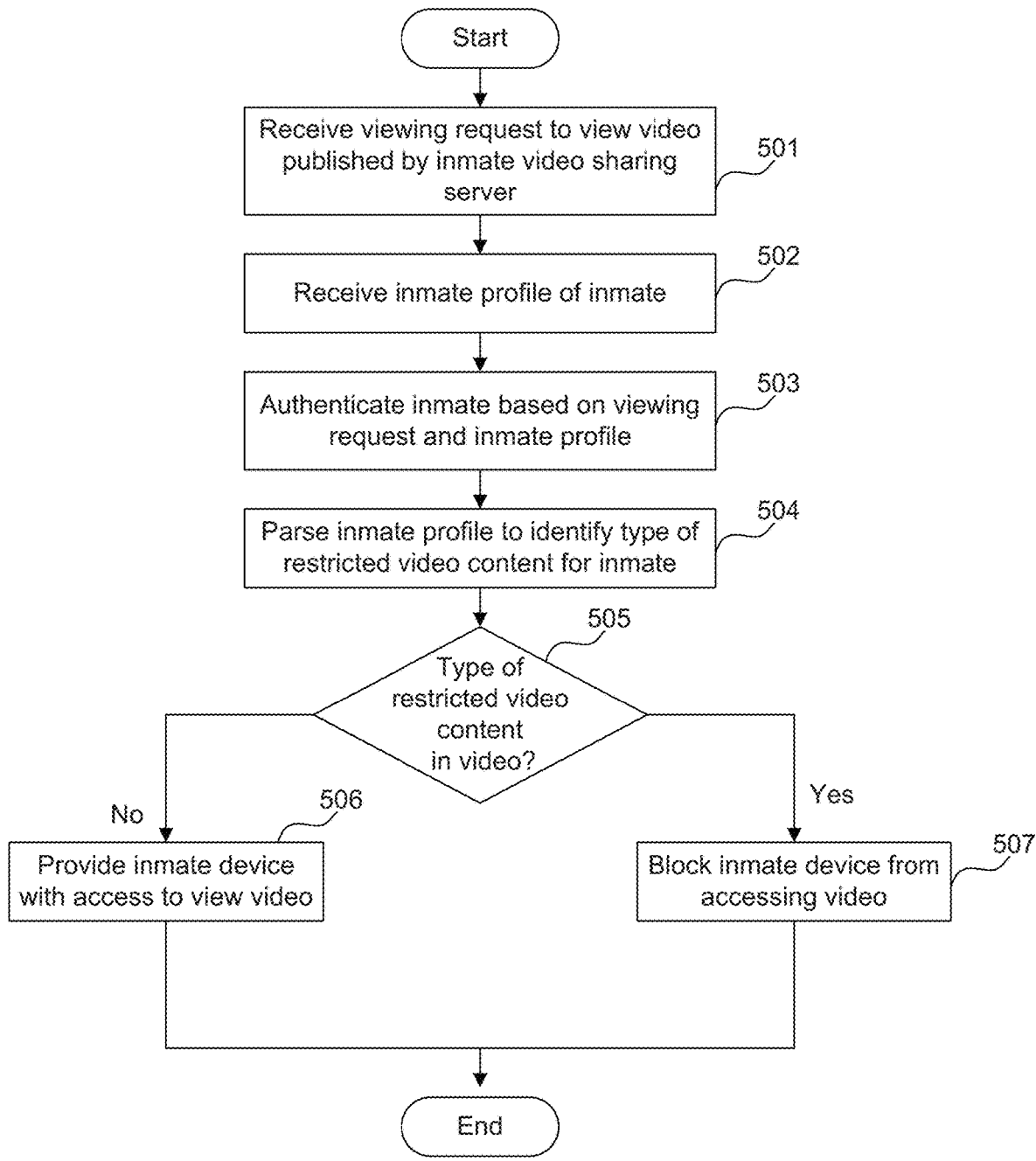
FIG. 5 illustrates a flowchart diagram of a method for allowing inmates to view uploaded video content in the video sharing service, according to embodiments of the present disclosure.

FIG. 5 illustrates a flowchart diagram of a method 500 of allowing inmates to view uploaded video content in the video sharing service, via an inmate video sharing server, such as inmate video sharing server 200 of FIG. 2, according to embodiments of the present disclosure. The steps of method 500 are performed by modules of inmate video sharing server 200, such as inmate profile module 208, registration module 210, video analysis module 212, rating module 214, video sharing library 216, and/or video access module 218. Method 500 of FIG. 5 begins with step 501 of receiving a viewing request to view a video published by inmate video sharing server. For example, the video access module 218 of inmate video sharing server 200 receives a viewing request to view a video published to video sharing library 216 by inmate video sharing server 200. In some cases, the video is published to video sharing library 216 after registration of the inmate for video sharing service and uploading of video content according to steps 401-410 in method 400 of FIG. 4.

At step 502, inmate video sharing server retrieves the inmate profile of the inmate. For example, the registration module 210 of inmate video sharing server 200 retrieves the inmate profile of the inmate from the inmate profile module 208, in which the inmate profile includes personal information of the inmate. At step 503, inmate video sharing server authenticates the inmate based on the viewing request and the inmate profile. For example, the registration module 210 of inmate video sharing server 200 authenticates the inmate based on user credentials provided in the viewing request and the inmate profile. For example, the registration module 210 of inmate video sharing server 200 authenticates the inmate by matching user credentials provided in the viewing request with user credentials/personal information included in the inmate profile.

At step 504, inmate video sharing server parses the inmate profile to identify a type of restricted video content for the inmate. For example, the video access module 218 of inmate video sharing server 200 parses the personal information of the inmate profile to identify a type of restricted video content for the inmate, such as at least one of profanity, obscenity, nudity, violence, and video content associated with gang affiliations, previous incidents with other inmates and employees of the correctional facility, and/or legal personnel of the inmate. In some cases, the inmate profile also includes data regarding rating values of videos that the inmate is permitted to view. At step 505, inmate video sharing server determines whether or not the video includes the type of restricted video content which the inmate is restricted from viewing. For example, the video access module 218 of inmate video sharing server 200 determines whether or not the video includes the type of restricted video content that the inmate is restricted from watching based on the rating value of the video and the data regarding rating values of videos that the inmate is permitted to watch.

If the video does not include the type of restricted video content that the inmate is restricted from watching, then method 500 in this example proceeds to step 506. At step 506, inmate video sharing server provides an inmate device of the inmate with access to view the video. For example, the video access module 218 of inmate video sharing server 200 provides the inmate device 300 of the inmate with access to view the video. If the video includes the type of restricted video content that the inmate is restricted from watching, then method 500 in this example proceeds to step 507. At step 507, inmate video sharing server blocks the inmate device of the inmate from accessing the video. For example, the video access module 218 of inmate video sharing server 200 blocks the inmate device 300 of the inmate from accessing the requested video.

Figure 6:
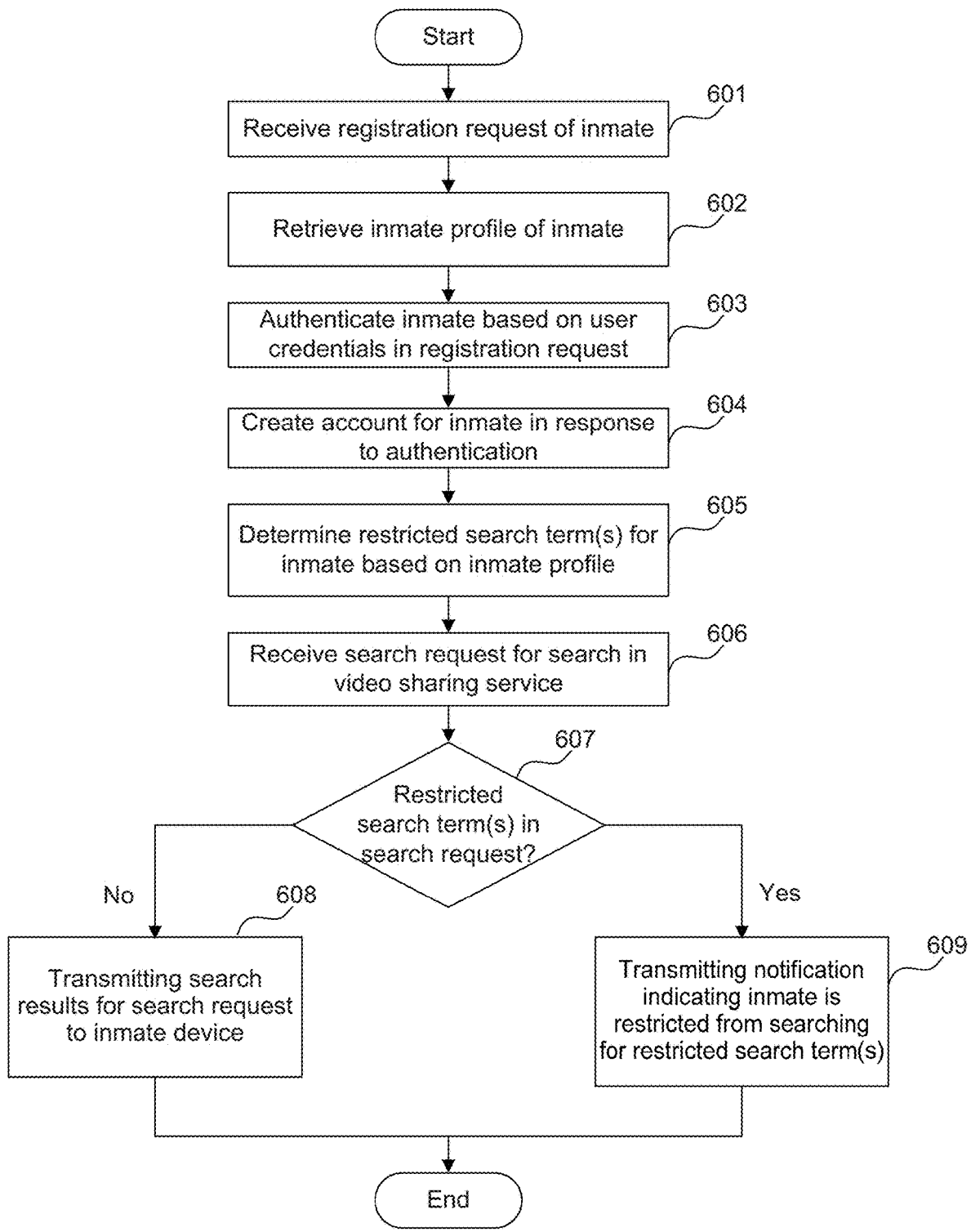
FIG. 6 illustrates a flowchart diagram of a method for restricting search terms for inmates accessing video content in the video sharing service, according to embodiments of the present disclosure.

FIG. 6 illustrates a flowchart diagram of a method 600 of restricting search terms for inmates accessing video content in the video sharing service, via an inmate video sharing server, such as inmate video sharing server 200 of FIG. 2, according to embodiments of the present disclosure. The steps of method 600 are performed by modules of inmate video sharing server 200, such as inmate profile module 208, registration module 210, video analysis module 212, rating module 214, video sharing library 216, and/or video access module 218. Method 600 of FIG. 6 begins with 601 of receiving a registration request of an inmate. For example, the registration module 210 of inmate video sharing server 200 receives a registration request from inmate device 300 for registration of an inmate for video sharing service in a correctional facility (e.g., via first inmate communication system 130 or second inmate communication system 140).

At step 602, the inmate video sharing server retrieves an inmate profile of the inmate. For example, the registration module 210 of inmate video sharing server 200 retrieves the inmate profile of the inmate from the inmate profile module

208, in which the inmate profile includes personal information of the inmate. At step 603, the inmate video sharing server authenticates the inmate based on the registration request and the inmate profile of the inmate. For example, the registration module 210 of inmate video sharing server 200 authenticates the inmate by matching user credentials provided in the registration request with user credentials/personal information included in the inmate profile. At step 604, the inmate video sharing server creates an account for the inmate. For example, the registration module 210 of inmate video sharing server 200 creates an account for the inmate for the video sharing service in response to authentication of the inmate.

At step 605, the inmate video sharing server determines one or more restricted search terms for the inmate based on the inmate profile. For example, the video access module 218 of inmate video sharing server 200 determines restricted search terms to restrict each inmate from searching for in the video sharing service based on inmate profiles retrieved from inmate profile module 208. In some cases, the video access module 218 parses the inmate profile to identify personal information of the inmate including at least one of gang affiliations, previous incidents with other inmates and/or correctional facility employees, and legal personnel of the inmate and determines one or more words, phrases, or names to restrict the inmate from searching for based on the personal information of the inmate.

At step 606, the inmate video sharing server receives a search request for a search in the video sharing service. For example, the video access module 218 of inmate video sharing server 200 receives a search request for a search in the video sharing library 216 from the inmate device 300. At step 607, the inmate video sharing server determines whether there are any restricted search terms in the search request received from the inmate device. For example, the video access module 218 of inmate video sharing server 200 identifies whether at least one restricted search term is in the search request from the inmate device 300

If there are no restricted search terms in the search request, then method 600 in this example proceeds to step 608. At step 608, the inmate video sharing server transmits the search results for the search request to the inmate device. For example, the video access module 218 of inmate video sharing server 200 transmits the search results corresponding to the search request to the inmate device 300, in which the search results include one or more links (e.g., uniform record locators (URLs) or hyperlinks) to videos on the video sharing library 216. If there is at least one restricted search term in the search request, then method 600 in this example proceeds to step 609.

At step 609, the inmate video sharing server transmits a notification to the inmate device indicating that the inmate is restricted from searching for the at least one restricted search term. For example, the video access module 218 of inmate video sharing server 200 transmits a notification to inmate device 300, in which the inmate device 300 indicates that the inmate is restricted from searching for the at least one restricted search term. In some embodiments, the video access module 218 restricts the inmate device 300 from viewing one or more search results corresponding to the at least one restricted search term included in the first search request.

In additional embodiments, the video access module 218 further restricts the inmate device 300 from transmitting additional search requests including one or more of the restricted search terms. However, the inmate device 300 can also send one or more subsequent search requests to the inmate video sharing server 200, in which the one or more subsequent search requests do not include any of the restricted search terms. Upon receiving the one or more subsequent search requests, the video access module 218 identifies that each subsequent search request does not include any of the restricted search terms and transmits the search results corresponding to each subsequent search request to inmate device 300.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 7:
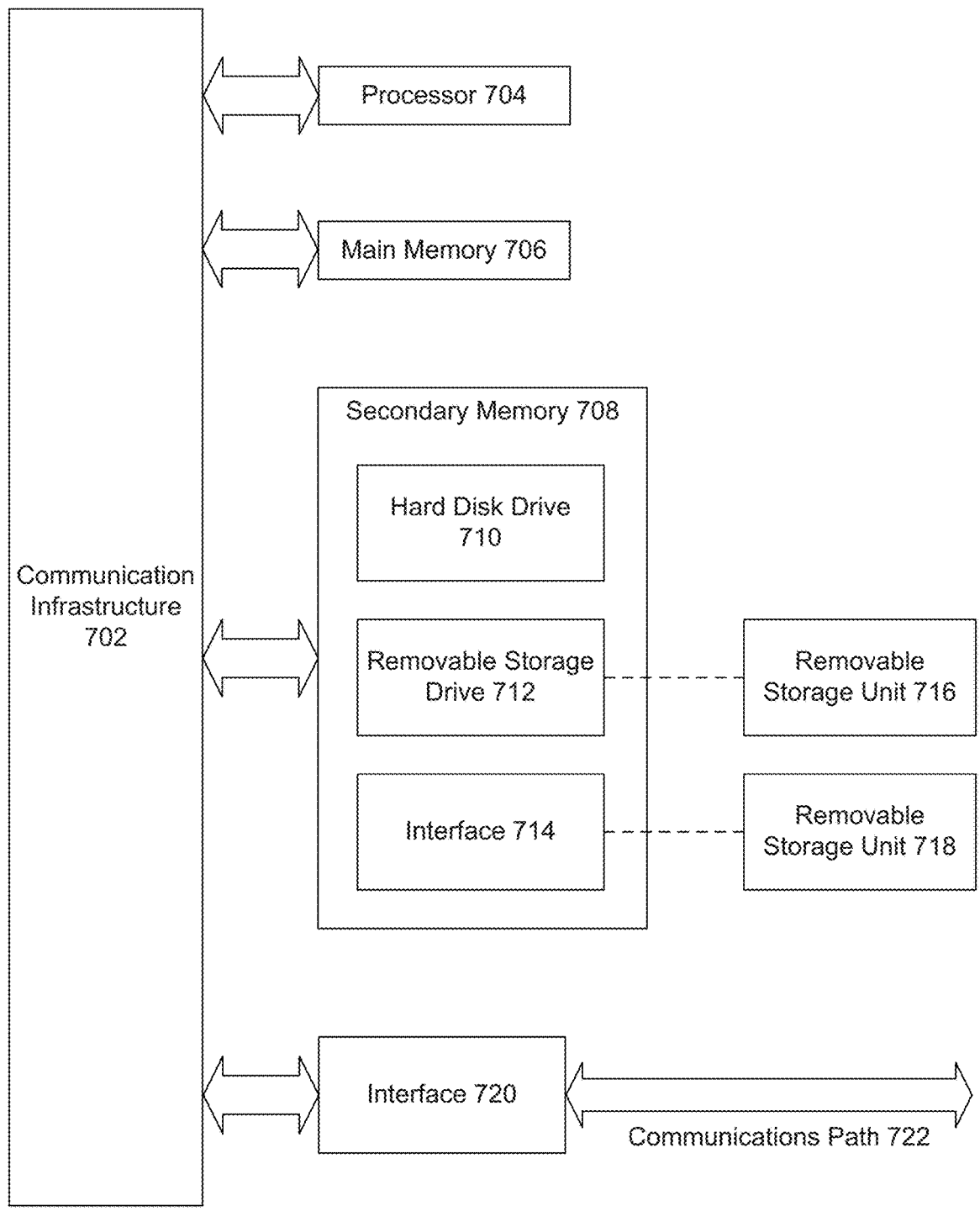
FIG. 7 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 5-6 can be implemented in the environment of one or more computer systems or other processing systems. An example of such a computer system 700 is shown in FIG. 7. One or more of the modules depicted in the previous figures can be at least partially implemented on one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, and the like. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for a video sharing service for inmates within a plurality of correctional facilities, the system comprising:
   an inmate device associated with an inmate in a correctional facility;
   a database that stores inmate profiles for a plurality of inmates;
   a video sharing server comprising at least one processor and a memory; and
   a network that communicatively couples the inmate device, the database, and the video sharing server, wherein the at least one processor of the video sharing server is configured to:
   receive a registration request for registration of the inmate for the video sharing service from the inmate device, the registration request including user credentials of the inmate;
   retrieve an inmate profile of the inmate from the database;
   authenticate the inmate based on matching the user credentials with personal information included in the inmate profile, wherein the inmate profile includes approval from the correctional facility based on behavioral criteria including good conduct required to register for and use the video sharing service
   create an account for the inmate for the video sharing service in response to authentication of the inmate;
   determine restricted search terms to restrict the inmate from searching for in the video sharing service based on the inmate profile;
   automatically update a data store of restricted information with the restricted search terms based on the inmate profile, to restrict the inmate from searching for the restricted search terms in the video sharing service;
   receive, from the inmate device, a first search request for a first search for a video in the video sharing service;
   identify, based on the inmate profile, a restricted search term in the first search request from the inmate device;
   transmit, to the inmate device, a notification indicating that the inmate is restricted from searching for videos associated with the restricted search term; and
   restrict the inmate device from transmitting additional search requests to the video sharing service that include the restricted search term.

2. The system of claim 1, wherein to determine the restricted search terms, the at least one processor of the video sharing server is configured to:
   parse the inmate profile to identify personal information of the inmate including at least one of gang affiliations, previous incidents with other inmates and employees of the correctional facility, and legal personnel of the inmate; and
   determine the restricted search terms corresponding to the personal information of the inmate, wherein the restricted search terms include at least one of words, phrases, or names.

3. The system of claim 1, wherein to create the account, the at least one processor of the video sharing server is configured to:
   generate a personal identification number (PIN) for the inmate for accessing the video sharing service; and
   associate the PIN with the account for the inmate.

4. The system of claim 1, wherein the at least one processor of the video sharing server is further configured to:
   restrict the inmate device from viewing a search result corresponding to the restricted search term in the first search request.

5. The system of claim 1, wherein the at least one processor of the video sharing server is further configured to:
receive, from the inmate device, a second search request for a second search in the video sharing service;
identify that the second search request does not include any of the restricted search terms; and
transmit search results corresponding to the second search request to the inmate device.

6. An inmate video sharing server comprising at least one processor and memory and configured to host a plurality of videos uploaded by inmates for a video sharing service, wherein the at least one processor is configured to:
receive, from an inmate device, a registration request for registration of an inmate for the video sharing service, the registration request including user credentials of the inmate;
retrieve an inmate profile of the inmate from a database;
authenticate the inmate based on matching the user credentials with personal information included in the inmate profile, wherein the inmate profile includes approval from the correctional facility based on behavioral criteria including good conduct required to register for and use the video sharing service;
create an account for the inmate for the video sharing service in response to authentication of the inmate;
determine restricted search terms to restrict the inmate from searching for in the video sharing service based on the inmate profile;
automatically update a data store of restricted information with the restricted search terms based on the inmate profile, to restrict the inmate from searching for the restricted search terms in the video sharing service;
receive, from the inmate device, a first search request for a first search for a video in the video sharing service;
identify, based on the inmate profile, a restricted search term in the first search request from the inmate device;
transmit, to the inmate device, a notification indicating that the inmate is restricted from searching for videos associated with the restricted search term; and
restrict the inmate device from transmitting additional search requests to the video sharing service, that include the restricted search term.

7. The inmate video sharing server of claim 6, wherein to determine the restricted search terms, the at least one processor is configured to:
parse the inmate profile to identify personal information of the inmate including at least one of gang affiliations, previous incidents with other inmates and employees of the correctional facility, and legal personnel of the inmate; and
determine the restricted search terms corresponding to the personal information of the inmate, wherein the restricted search terms include at least one of words, phrases, or names.

8. The inmate video sharing server of claim 6, wherein to create the account, the at least one processor is configured to:
generate a personal identification number (PIN) for the inmate for accessing the video sharing service; and
associate the PIN with the account for the inmate.

9. The inmate video sharing server of claim 6, wherein the at least one processor is further configured to:
restrict the inmate device from viewing a search result corresponding to the restricted search term in the first search request.

10. The inmate video sharing server of claim 6, wherein the at least one processor is further configured to:
receive, from the inmate device, a second search request for a second search in the video sharing service;
identify that the second search request does not include any of the restricted search terms; and
transmit search results corresponding to the second search request to the inmate device.

11. The inmate video sharing server of claim 6, wherein the at least one processor is further configured to:
associate data regarding the restricted search terms with the account for the inmate, resulting in a data association; and
store the data association in the memory of the video sharing server.

12. A method for providing a video sharing service for inmates to access videos in a correctional facility, the method comprising:
receiving, from an inmate device, a registration request for an inmate in the correctional facility to register to access videos with the video sharing service, the registration request including user credentials of the inmate;
retrieving, by a video sharing server, an inmate profile for the inmate from an inmate profile database;
authenticating the inmate based on matching the user credentials with personal information included in the inmate profile, wherein the inmate profile includes approval from the correctional facility based on behavioral criteria including good conduct required to register for and use the video sharing service;
creating an account for the inmate for the video sharing service in response to authentication of the inmate;
determining restricted search terms to restrict the inmate from searching for in the video sharing service based on the inmate profile;
automatically updating a data store of restricted information with the restricted search terms based on the inmate profile, to restrict the inmate from searching for the restricted search terms in the video sharing service;
receiving, from the inmate device, a first search request for a first search for a video in the video sharing service;
identifying, based on the inmate profile, a restricted search term in the first search request from the inmate device;
transmitting, to the inmate device, a notification indicating that the inmate is restricted from searching for videos associated with the restricted search term; and
restricting the inmate device from transmitting additional search requests to the video sharing service, that includes the restricted search term.

13. The method of claim 12, wherein the determining of the restricted search terms further comprises:
parsing the inmate profile to identify personal information of the inmate including at least
one of gang affiliations, previous incidents with other inmates and employees of the correctional facility, and legal personnel of the inmate; and
determining the restricted search terms corresponding to the personal information of the inmate, wherein the restricted search terms include at least one of words, phrases, or names.

14. The method of claim 12, wherein the creating the account further comprises:

generating a personal identification number (PIN) for the inmate for accessing the video sharing service; and associating the PIN with the account for the inmate.

15. The method of claim 12, further comprising:

restricting the inmate device from viewing a search result corresponding to the restricted search term in the first search request.

16. The method of claim 12, further comprising:

receiving, from the inmate device, a second search request for a second search in the video sharing service;

identifying that the second search request does not include any of the restricted search terms; and transmitting search results corresponding to the second search request to the inmate device.

17. The method of claim 12, further comprising:

associating data regarding the restricted search terms with the account for the inmate, resulting in a data association; and storing the data association in a memory of the video sharing server.

* * * * *